United States Patent

Polle

[11] Patent Number: 5,698,615
[45] Date of Patent: Dec. 16, 1997

[54] CABLE WITH A FILLING COMPOUND AND METHOD FOR THE MANUFACTURE THEREOF

[75] Inventor: Hubert Polle, Coburg, Germany

[73] Assignee: Siemens Aktiengesellschaft, Munich, Germany

[21] Appl. No.: 647,055

[22] Filed: May 9, 1996

[30] Foreign Application Priority Data

May 9, 1995 [DE] Germany .............. 195 16 970.0

[51] Int. Cl.⁶ .................. G02B 6/44; H02G 15/00
[52] U.S. Cl. .................. 523/173; 174/24; 385/100; 385/102; 385/105; 385/109; 428/36.4; 428/523
[58] Field of Search ............... 523/173; 174/24; 385/100, 102, 105, 109; 428/36.4, 523

[56] References Cited

U.S. PATENT DOCUMENTS

| 5,049,593 | 9/1991 | Marciano-Aqostinelli et al. ... 523/173 |
| 5,179,611 | 1/1993 | Umeda et al. .......................... 523/173 |
| 5,218,011 | 6/1993 | Freeman ............................... 523/173 |
| 5,285,513 | 2/1994 | Kaufman et al. ..................... 523/173 |
| 5,306,867 | 4/1994 | Connole et al. ..................... 523/173 |
| 5,335,302 | 8/1994 | Polle .................................... 385/100 |

FOREIGN PATENT DOCUMENTS

| 375 685 | 7/1990 | European Pat. Off. . |
| 26 05 395 | 9/1976 | Germany . |
| 42 19 607 | 12/1993 | Germany . |

*Primary Examiner*—Kriellion S. Morgan
*Attorney, Agent, or Firm*—Hill, Steadman & Simpson

[57] ABSTRACT

A cable has a filling compound (CA1, CA2) containing a swelling powder and at least one additive substance. This additive substance is mixed with the swelling powder and lies between the particles of the swelling powder to provide good water accessibility to the individual particles of the swelling powder given an incursion of water throughout the cable interspaces.

33 Claims, 6 Drawing Sheets

CABLE WITH A FILLING COMPOUND AND METHOD FOR THE MANUFACTURE THEREOF

BACKGROUND OF THE INVENTION

The invention generally relates to optic cables having waveguides. More particularly, the invention relates to such cables having a filling compound surrounding the waveguides within an outer cover.

U.S. Pat. No. 5,218,011 discloses filling compounds for electrical cables that contain a swelling agent (for example, a water-absorbent polymer) as well as a dielectric oil, whereby highly dispersed silicon dioxide and plastic microspheres can be added as warranted. A pasty, gel-like matrix is formed by employing correspondingly high oil parts (>30 weight %). The filling compound is introduced in this form into the cable core together with the electrical conductors.

EP 0 375 685 discloses a filling substance for longitudinally sealing electrical and/or optical cables, wherein the substance contains a swellable, powdered substance as well as hydrophobic, pasty compounds in the form of low-viscosity petrolatum, and whereby hollow plastic microspheres can be additionally added. This filling compound also forms a gel-like substance, and the pasty properties are assured by the employment of correspondingly high proportions of the soft petrolatum (e.g., 43 volume %).

EP 0 589 274 discloses a light waveguide buffer tube with a filling compound that is given a paste-like consistency by adding oil, whereby hollow microspheres are embedded into the filling compound. The diameter and/or plurality of the microspheres are selected such that a light waveguide located in their proximity exhibits a displaceability within the filling compound that is adequate to accommodate motion events.

Filling compounds of the above-described type, which include oil-like or wax-like constituents, are disadvantageous in that these oil-containing substances are hydrophobic and may inhibit the swelling process of the swelling powder given the penetration of water. Under certain circumstances, the swelling process for at least a part of the swelling powder may be delayed over a long time by these hydrophobic materials.

A further disadvantage of these oil-like or wax-like substances is that not all plastics commonly used for cable components (e.g., the insulating materials) are adequately resistant to the oil-containing substances. Thus, the filling compound and the employed plastic materials must be carefully matched to one another.

DE 26 05 395 C2 discloses a water-tight electrical cable that is filled with a hydrophobic and with a hydrophilic powder, whereby the hydrophilic powder forms a viscous, swelling material given contact with water. The dust-dry powder mixture is introduced into the interstices between the conductors of the cable core, whereby these are only partially filled. Upon penetration of water, the hydrophilic powder forms a high-viscosity gel that is repelled by the hydrophobic powder. In order to assure a better adhesion of the powder to the conductors, the latter can be moistened with a hydrophobic oil that is compatible with a respectively employed insulation.

Furthermore, it is known to coat the inside surface of small tubes containing light waveguides with swelling powder, as disclosed in DE 42 19 607 A1.

A difficulty associated with the employment of swelling powders as filling compounds is that the swelling powder particles first reached by the water immediately increase greatly in spatial expanse and thereby impede the flow of water to the other swelling powder particles lying spatially therebehind. It can even occur in the extreme case that a type of swelling powder clump is formed such that a tight envelope of expanded swelling powder is present on the outside, leaving completely unswelled, dry swelling powder in the space therebehind.

SUMMARY OF THE INVENTION

The present invention is based on the object of providing an improved cable having a powdered filling and parting material such that the swelling process can occur in an optimally effective way.

This object is inventively achieved by providing an additive powder with the particles of the swelling powder in a well-mixed and distributed manner, such that the swelling powder particles are separated from one another by the particles of the additive powder, and such that, upon penetration of water, an advancing access of water to neighboring particles of the swelling powder is promoted by this parting effect.

The additive powder of the invention thus effects a spatial separation of the individual swelling powder particles sufficient to assure access of water to these particles separated in this way. As a result, a greater number of swelling powder particles are utilized in the swelling process in a tight space (practically all of them in the best case). With the invention, the swelling results in a high degree of volume increase and sealing in the presence, and with a relatively slight proportion of swelling powder.

Accordingly, cables of the invention can be more cost-effectively manufactured. Specifically, a smaller proportion of the relatively expensive swelling powder is needed for a volume to be filled given the entry of water, resulting in extremely favorable dielectric properties of the filler mixture.

The various components of the filling compound employed within the scope of the invention and the applied possibilities thereof are discussed in detail below.

Swelling Powder:

Such swelling powders are currently usually synthetically manufactured, then granulated and ground. Superfine dust-sized particles have usually been undesirable for sanitary purposes. These, however, are of special interest within the scope of the invention, for which reason standard swelling powders are potentially reground and/or sieved and, preferably, dried (for dielectric reasons). Swelling powders usually absorb 100 to 300 times their weight in water, and greatly increase in volume to a corresponding extent.

When used as a cable filling, a conventional problem is that the swelling powders swell so quickly that the provided water can only spread over short distances. For this reason, it is necessary for penetrating water to encounter swelling powder particles as quickly as possible and each such particle should be optimally freely accessible to water.

It is therefore expedient to employ extremely fine swelling powder that is optimally uniformly distributed in the filling compound. Particle sizes below 100 μm, and preferably below 50 μm, are therefore expediently employed for the swelling powder itself, whereby a size range between 1 μm and 30 μm is especially expedient. The recited particle size is defined here—and in the following examples—by the sieve size respectively employed.

When special measures are not undertaken, swelling powder usually contains a noticeable proportion of water at an "equilibrium moisture" which generally lies on the order of magnitude of between about 3 and 6 weight % water. This water part is fundamentally undesirable in electrical cables. However, when one considers that the water part is also extremely slight given a slight proportion of swelling powder in the overall filling volume, so the disturbing influence can be reduced to a negligible extent. This can particularly be achieved where the disturbing influence of the moisture is diminished by a correspondingly high proportion of microspheres, especially compressible microspheres (for example, hollow microspheres) that absorb practically no water. The disturbing influence of the moisture of the swelling powder may be reduced further by the addition of additive powders.

In general, it is therefore not necessary to undertake a drying of the mixtures or of the swelling powder for the given filling compounds of the invention in order to reduce the water part determined by the equilibrium moisture. The processing of the filling compound can thus be significantly simplified.

Additive Powder (Parting Powder):

An agglomeration of the swelling powder particles, for example, is largely prevented by the additive powder acting as parting powder, so that the smallness of the swelling powder particles can be fully exploited for the water access (separating effect). It is especially expedient to employ additive powder with a size of the particles that is smaller than the size of the particles of the swelling powder. An especially effective separation of the swelling powder particles can be achieved with the additive powder due to the use of especially small particles of the additive powder. In this way, one can work with relatively slight parts of additive powder in the filling compound.

The swelling powder (and preferably other potentially present powder parts) expediently have their surface coated with at least a single layer of the far, far smaller particles of the additive powder. For example, with a 40 μm swelling powder particle, about 0.2 weight % of a highly dispersive $SiO_2$ having a 0.01 μm particle size suffices to create a surface coating which is effective to separate the swelling powder particles from one another.

The size of the additive powder particles is preferably below 1/10, preferably below 1/100 and particularly preferably between 1/100 and 1/200 of the size of the particles of the swelling powder. The particle sizes preferably lie below 1 μm, expediently below 0.1 μm and, advantageously, even below 0.05 μm. Particles sizes of about 0.01 μm are especially expedient.

Substances that can be easily ground into extremely small particles sizes or, respectively, that can be manufactured superfine and that can be mixed well with the swelling powder are especially suitable as separating additive powder. Inorganic powders, preferably highly dispersive powders, for example talcum, mica, graphite and especially silicates are especially suitable, whereby $SiO_2$ can be employed (for example, "Aerosil" of the Degussa company). Further, bentonites or montmorillonites are employable, and mixtures of the aforementioned substances can also be employed.

The weight part of additive powder can be advantageously selected to be significantly lower than the weight part of swelling powder (and also lower than the weight part of other potential powder parts). Lower additive powder weight corresponds to smaller respective additive powder particles, compared to the other particles, especially the swelling powder. When correspondingly fine additive powder is employed, then an additive is usually sufficient of less than 10 weight %, preferably less than 2 weight % and, in particular, between 0.1 and 2 weight % additive powder for respectively 100 weight % swelling powder. Especially advantageous values given correspondingly fine additive powders lie from 0.2 through 0.5 weight %, and especially expedient and effective values of around 0.3 weight % additive powder with reference to 100 weight % swelling powder.

Other Powder Parts;

According to embodiments of the invention, other powder parts may be added to the filling compound, their grain sizes being expediently selected about on the order of magnitude of the swelling powder particles or somewhat smaller, i.e. between 1 and 100 μm. These other, preferably inert powder parts are likewise coated with and separated by the additive powder which is orders of magnitude smaller. These particles in the μm range (filler particles) are essentially to fill the volume to be sealed with inexpensive materials, which do not absorb moisture and which are usually dielectrically beneficial and, thus, should contribute to the approximately uniform distribution of the fine swelling powder particles over the space.

Very different substances can be selected for the other powder parts depending on the particular demands. In one instance, thus, organic substances (plastic materials) such as polyolefin powder (for example PE and PP powder) may be used. However, inorganic substances can also be employed, such as finely distributed silicates, oxides and carbonates. Aluminum hydroxide or magnesium hydroxide can be selected in order to achieve flame-retardant properties.

Oil or Other Binders

The employment of pure powder mixtures are disadvantageous during processing in that special safety measures (dust protection) must be undertaken during their processing and mixing, as well as when they are introduced into the cable core. An object, therefore, is to create a filling compound that can be easily worked. This object is achieved in that the filling compound comprises an additive in the form of oil or an adhesive whose part in the filling compound is selected so low that the filling compound is prevented from giving off dust during processing and without the formation of a paste-like consistency of the filling compound.

Whereas conventional filling compounds are formed of dust-dry or pasty compounds with high oil and wax parts, the invention pursues an entirely different course here. Here, the addition of oil or adhesives is not to obtain soft, pasty compounds, as in the known prior art, but rather, a presence of oil is kept so low that the filling compound is just barely prevented from giving off dust during processing. This low proportion of oil or adhesive produces practically no restriction, for instance, of the oil-resistant properties of the employed plastics, since these slight oil or glue parts are blocked so greatly by the powdered constituents that a degradation of neighboring plastic materials is largely avoided. At the same time, however, the filling compound is "bonded" to such an extent by the slight proportion of oil or adhesive such that powder dust is prevented during processing. The slight oil or adhesive additives also do not cause any impediment of the swelling powder because their inherent hydrophobic properties do not yet negatively take effect because of the slight oil or adhesive part.

Low-viscosity polyolefins such as white oils and polybutenes and those having specific adhesive properties such as polyisobutylenes are preferably utilized. Oil-like substances, for example low-viscosity hydrocarbon compounds with at least one oxygen atom (for example, multivalent alcohols such as polyglycols), fatty acids, fatty acid esters or polyether alcohols, etc., are also advantageous. The additive should expediently have viscosities below 500 mPas, preferably<100 mPas. The range from 1–200 mPas is especially suitable.

The additive (oil or glue part) to the powdered filling compound employed for bonding dust should be expediently selected below 5 volume %, preferably between 1 volume % and 3 volume %.

Other bonding agents, for example glues including low-viscosity PVC softeners on the basis of phthalic acid esters or, respectively, adipinic acid ester, are also especially suited an additives within the scope of the invention.

Not only is the creation of dust during processing greatly limited or prevented due to the additive in the form of a slight part of oil or other binder, but the mixture yields an improved adhesion in the interspaces or interstices of the cable core, so that it is less likely to fall out during processing, to prevent de-mixing, and so it can nonetheless still be easily removed.

It can also be expedient to slightly moisten the components (e.g. conductors, buffer tubes etc.) of the cable core with oil or with a sticky liquid or to treat the filled core similarly in order to improve the adhesion of the filling compound.

Microspheres:

It is expedient to add microspheres, particularly compressible microspheres, to the filling compound, whereby the use of hollow microspheres is especially advantageous. These, for example, can be composed of polyvinylidenechloride (for example, "EXPANCEL 551 DE" of the Expancel company). The use of hollow microspheres of polyacrylate is especially desirable (for example, "EXPANCEL 091 DE" of the Expancel company). Such small hollow microspheres are advantageously lightweight, inexpensive per volume, and comprise beneficial dielectric properties, this being advantageous in view of use in electrical cables. They are non-hazardous in processing, and the latter can be easily disposed of since they contain no halogens.

Preferably, the microspheres balls should have a diameter between 5 μm and 100 μm in their uncompressed condition, and should be around the same order of magnitude of size as the swelling powder particles. An additive of microspheres in the filling compound additionally has the specific advantage that the hollow microspheres additionally contribute to preventing swelling powder particles from sticking or adhering to one another. The swelling powder particles are separated from one another by the hollow microspheres given appropriate processing, i.e. fine blending with the powdered filler material, and a formation of clumps is thereby prevented. Care should always be exercised so that a large swelling powder surface is provided for the water in the smallest space in order to achieve a high swelling speed.

The invention can be employed both for electrical as well as for optical cables. Since the demands differ in part in these two applications, these shall be discussed separately below.

Electrical Cables:

For high-voltage cables, the dielectric properties of mixtures of swelling powder and other powders are of only slight significance, so that inexpensive powder blends or powers having flame-retardant properties may be predominantly selected. In communications cables, the filling compound between the leads and under the cladding critically influence the transmission properties. Dielectric constants (relative dielectric constants $\epsilon$) and dielectric losses of these fillers should lie as close as possible to the property of air, i.e. $\epsilon$ close to 1 and loss factors close to 0 over the entire frequency range.

Powder fillers of the invention have an advantage that they can contain high air parts between their grains, particularly about 30 through 70 volume % air. When a mixture whose powder particles have $\epsilon=3$ is used and it is assumed that these solid particles occupy a space of up to 50 volume %, then the dielectric constant of the mixture is still lower than filling with current standard petrolatum, with $\epsilon=2.25$. Further powder parts, for example filler or parting powders, which are inexpensive, not as dielectrically high-grade, but which nonetheless achieve similar or even better transmission properties compared to petrolatum-filled cables, may be additionally added to the swelling powder.

The conditions become even more favorable when dielectrically high-grade substances are used as filler powder, such as, for example, polyolefin powder (PE has $\epsilon\sim2.25$). Since the parting powder and potential oils or, respectively, adhesives only make up a few weight % overall, fillers with far more favorable properties than petrolatum are achieved.

Extremely favorable dielectric properties are achieved when hollow microspheres are selected as filler particles (potentially additionally mixed with dielectrically high-grade powders). At bulk density, the hollow microspheres that are provided have dielectric constants of around $\epsilon=1.02$, i.e. values that do not significantly differ from air.

The terms "true volume" and the "volume % [thereof]", as used herein, mean the volume without any and all air interspaces and, thus, not the bulk volume. For example, when a filler calculated in bulk volume is assumed having 40 volume % hollow microspheres, 5 volume % swelling powder, 2 volume % paraffin oil, 5 volume % PE powder and 3 volume % highly dispersed silicon dioxide and which contains 45 volume % as unfilled interstices in the cable core, then the dielectric constant can be estimated at below 1.5, particularly $\epsilon=1.3$ through 1.4.

By employing even more beneficial mixtures having a solids part <10 volume %, the dielectric constant of even undried mixtures of a similar nature can be reduced even further, for example to $\epsilon=1.2$. It is thereby important that, except for the swelling powder, dielectrically very high-grade and non-hygroscopic constituents are involved here and only an extremely slight amount of water is entrained into the cables with them even given undried mixtures.

It becomes possible, due to the low dielectric constants of the mixtures that, with a given operating capacity, communications cables filled with such mixtures need have only very slightly thicker leads than given untilled cables.

Optical Cables:

In addition to the necessity of sealing the cores with appropriate fillers, the problem of sealing the optical fiber buffer tubes against the access of water often additionally arises for optical cables, whereby very critical demands made on the mechanical properties of the fiber buffer tubes when filling compounds are also present.

The above considerations regarding electrical cables partly analogously apply for the use as core filling compound. This is especially true when the core, in addition to containing carrier elements, core windings and optical fiber buffer tubes, also contains electrical leads. When no electrical leads are contained, then the dielectric properties play no part.

Critical, additional mechanical demands are made on the filling compound when they serve as fillers of optical fiber buffer tubes that loosely contain one or more optical fibers lying individually or combined to form ribbons or when they serve as glide or buffer layer between the individual light waveguides and the rather tightly applied protective sheath given composite buffered fiber. Further, these demands also apply for the sealing of the chambers in chambered cables and U-profiles stranded around a carrier element that can contain both individual optical fibers as well as ribbons. Filling compounds that come into direct contact with the optical fillers (buffer tube filling compounds), for example for hollow leads, compact leads, chambers, U-profiles or the like, must be selected such that they allow an adequate mobility of the optical fibers under all operating conditions and do not lead to inadmissible, local pressure influences on the optical fibers. When the immediate environment of the light waveguides (fiber loose buffers, chambers and U-profiles, etc.) is largely filled with swelling powder/ powder mixtures, then all of the particles should be at least one order of magnitude smaller (for example, below 25 µm) than the outside diameter of the light waveguides provided with a coating (i.e., for example, less than 250 µm) in order to avoid pressure peaks and, thus, microbendings and increases in attenuation insofar as possible. Swelling powder, advantageously mixed with PE powder, having particles sizes <10 µm can thus be advantageously employed, whereby these particles are coated extremely thinly with additive powder as parting agent such as, for example, highly dispersed silicon dioxide and can be potentially bonded slightly with oil.

The aforementioned compositions with mixtures of swelling powder and additive powder as well as, potentially, filler powder, can be advantageously "diluted" by a part of highly compressible hollow microspheres. All constituents can be expediently coated with a little parting agent, for example highly dispersed silicon dioxide, and can potentially be slightly bonded with oil or the like. In this case, the swelling and additive as well as filler powders can also have larger particle diameters (potentially, even on the order of magnitude of the outside diameter of the light waveguides) since pressure peaks are avoided in this case by the cushioning with the highly compressible hollow balls. Such mixtures are considerably less expensive than the gel compounds currently employed.

The mixtures composed according to the invention are also especially advantageous because they are composed practically only of solids and do not influence the optical fiber buffer materials in the prescribed range of operating temperatures. The selection of the allowable optical fiber buffer materials is thereby practically not limited based on the filling compound.

Additional features and advantages of the present invention are described in, and will be apparent from, the detailed description of the presently preferred embodiments and from the drawings.

DETAILED DESCRIPTION OF THE PREFERRED EMBODIMENTS

Figure 1:
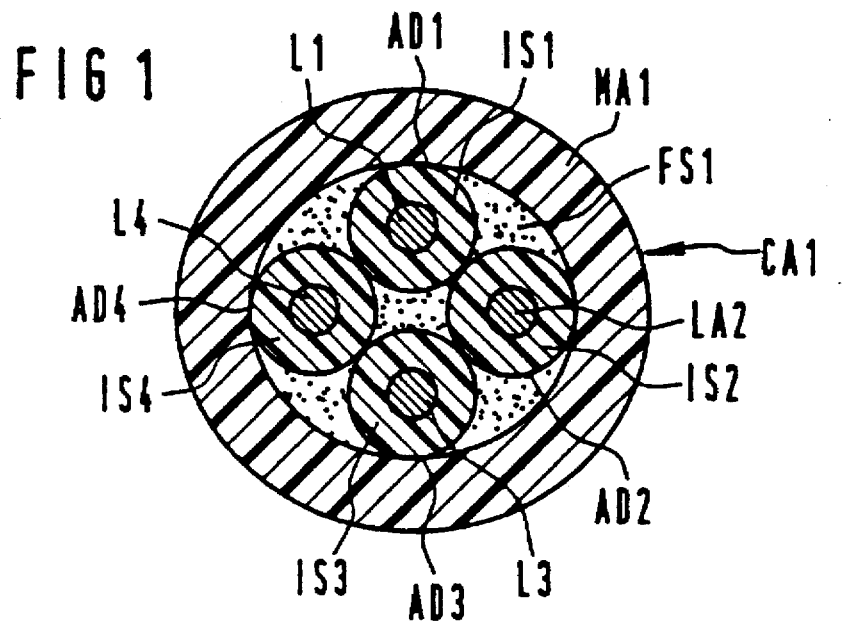
FIG. 1 is a sectional end view of an electrical cable with filling compound according to a first exemplary embodiment of the invention.

FIG. 1 shows an electrical cable CA1 whose single-layer or multi-layer outside cladding is referenced MA1. Four electrical leads AD1 through AD4 forming, for example, a star quad, are provided in the inside. The invention can also be employed in cables having more or fewer leads, as well as in high-voltage cables. Each of the leads AD1 through AD4 is composed of an electrical conductor L1 through L4, preferably of copper, and of an outer insulation IS1 through IS4, particularly of polyethylene. The interspaces or interstices are entirely or partially filled with a filling compound FS1 containing at least a swelling powder and an additive powder (for example, highly dispersed silicon dioxide).

Advantageously, an additive of oil or of an adhesive may also be provided so that the filling compound FS1 is prevented from giving off dust to the greatest possible extent. In addition, highly elastic microspheres, particularly hollow microspheres, can be provided in the filling compound. A fine powder, particularly polyethylene powder, can be added as other filler material. In order to assure a better adhesion, the surfaces of the leads AD1 through AD4 can be additionally coated with an oil or adhesive material before the application of the filling compound FS1.

As already mentioned, the free interstices within the cable core of a cable according to FIG. 1 are often not completely filled but only partially filled with filling material FS1, particularly when a swelling powder that leads to an increase in volume and, thus, to a longitudinal sealing of the cable upon access of water is contained in this filling material. In general, the cross-sectional space to be filled by the filling compound is on the order of magnitude of about 50% or less. A complete filling is also not practical because it would be many times more expensive than the petrolatum filling compounds that are currently generally utilized. Due to the high dielectric constant ε as well a higher loss factor, a complete filling would deteriorate the transmission properties of a cable filled in that way.

For this reason, the interstices is generally only partially filled. Given the materials that are currently standard for swelling powder, a volume part on the order of magnitude of 5% solids constituents would already suffice to fill the entire interstices cross-section in the swelled condition. It has been shown in practice that, given a partial filling of the cavities, the water upon water incursion first penetrates a few meters into the cable until a seal arises as a result of the swelling process of the swelling powder.

Figure 2:
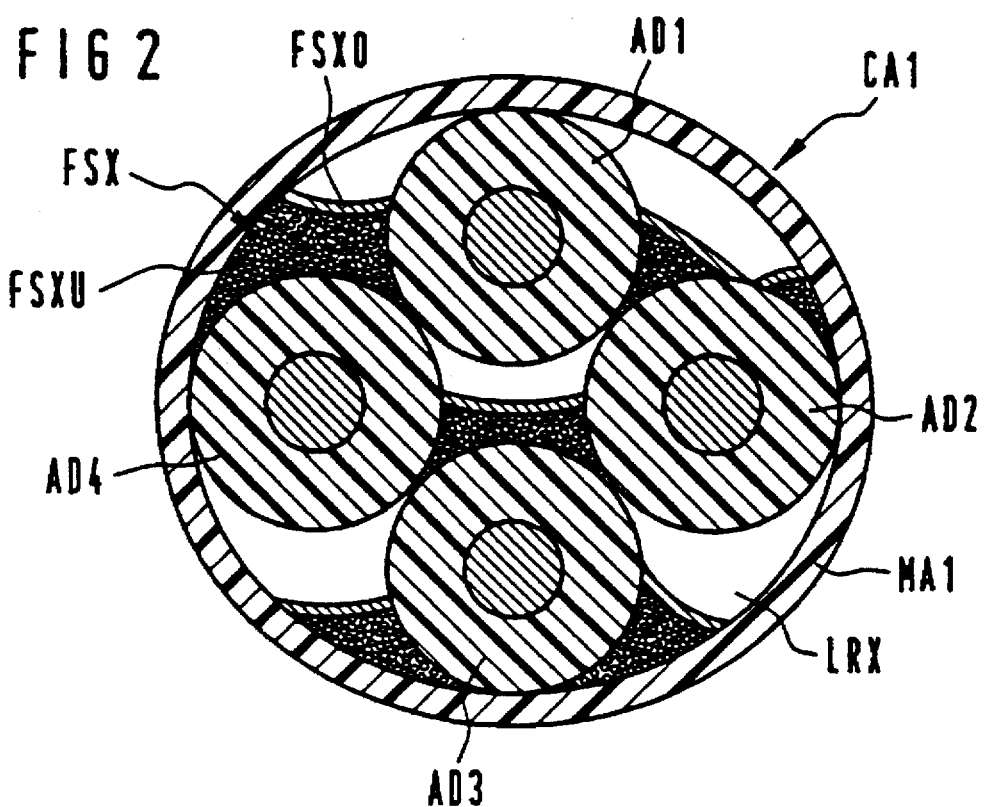
FIG. 2 is a sectional end view of a partially filled electrical cable.
Figure 3:
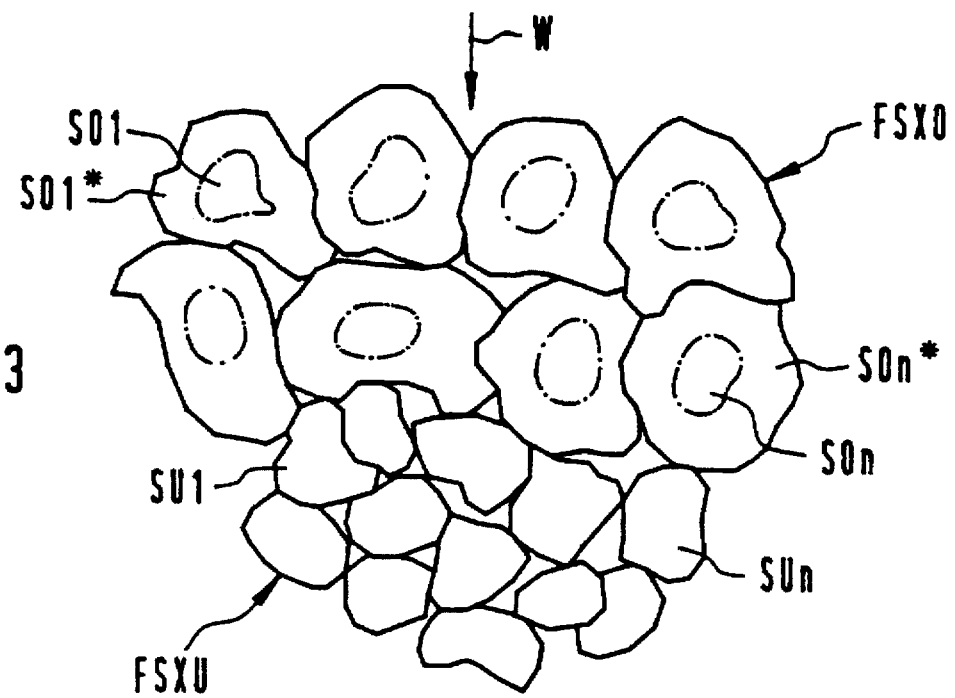
FIG. 3 is an enlarged schematic view of the distribution of swelling powder without additive powder in the swelled condition.

FIGS. 2 and 3 shall be referenced for explaining this undesired occurrence, whereby the cable of FIG. 1 is shown in FIG. 2, however with an only partially filled interior, i.e. there are air chambers LRX in which no filling compounds are present in addition to the sub-regions FSX filled with filling compound. As a consequence of the force of gravity and the effects on the filling compound portions FSX caused by impacts, the filling compound portions lie mainly in the lower regions of the respective interstices against the cladding MA1 or against the respective leads AD1 through AD4.

Even when enough swelling powder is present in order to completely fill up the existing air inclusions LRX given an access of water, it has nonetheless turned out that this swelling and filling event does not occur to an adequate extent given the access of water. As explained in greater detail with reference to FIG. 3, this can probably be attributed thereto that swelling powder particles lying at the outside prevent the access of water to particles lying farther toward the inside after a swelling process.

Swelling powder particles are schematically shown dot-dashed in two layers in the outer region in FIG. 3 and are referenced SO1 through SOn, an unswelled size being indicated in dot-dash lines. Given an access of water from the outside, as indicated by the arrow W, the particles SO1 through SOn increase greatly in volume and assume the structure SO1* through Son* indicated with solid lines.

As a result of the swelling event, the swelling powder particles SO1* through SOn* lying at the outside form a type of protective envelope or protective film FSXO and prevent further access of the water W to the swelling powder particles SU1 through SUn lying thereunder within the layer FSXU lying thereunder. These can obstructed from water to initiate the swelling process or, respectively, can only participate in the swelling process very late, and the water can therefore advance undesirably far, whereby this occurrence is all the more pronounced the greater the gaps in the cable core that are not filled with filling compounds. In FIG. 2, this "surface sealing" is shown with the regions FSXO indicated with shading, whereas the unexpanded parts of the swelling powder of the filling compound lying thereunder are referenced FSXU.

Figure 4:
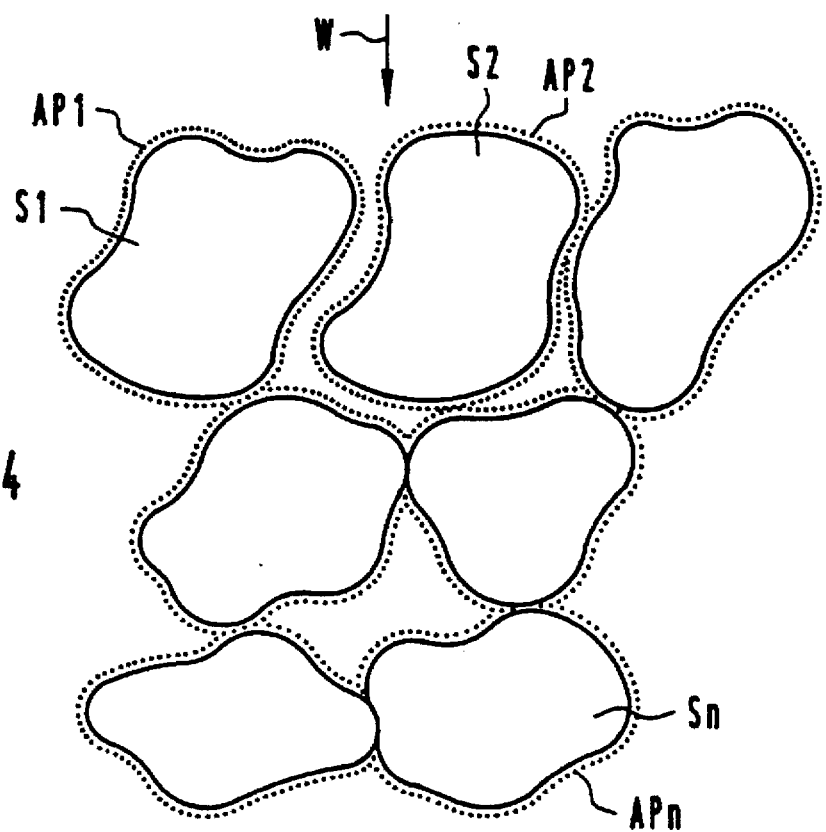
FIG. 4 is an enlarged schematic view of the distribution of swelling powder in the swelled condition with additive powder as parting powder added according to the invention.

For illustrating the improvement enabled by the invention, FIG. 4 shows unswelled swelling powder particles S1 through Sn in greatly magnified form. In order to keep the "sealing effect" shown in FIG. 3 from occurring, the individual swelling powder particles S1 through Sn are separated from one another in the unswelled condition by an additive powder AP1 through APn (parting powder) shown dotted. This parting powder AP1 through Apn does not swell when exposed to water. It is particularly expedient to use highly dispersed $SiO_2$ for this, whereby the particle size of the additive powder AP1 through Apn is expediently selected significantly smaller than the particle size of the swelling powder particles S1 through Sn. It is especially advantageous when this particle size of the additive powder AP1 through APn is selected less than 1/10 of the particle size of the swelling powder particles S1 through Sn. A type of dusting of the surfaces of the swelling powder particles S1 through Sn is especially expedient because the greatest possible effect using the least possible material for parting additive powder AP1 through Apn is then achieved. Given a potential incursion of water, indicated by the arrow W, the water molecules proceed not only to the upper layers of the swelling powder but also to those lying therebelow because the entire layer of swelling powder particles S1 through Sn continues to remain water-permeable as a result of the intervening portions of the additive powder AP1 through APn acting as parting agent even when the outer swelling powder particles, for example S1 and S2, participate in the beginning swelling process, so that layers lying therebelow are also very quickly and reliably reached by water and participate in the swelling process.

Figure 5:
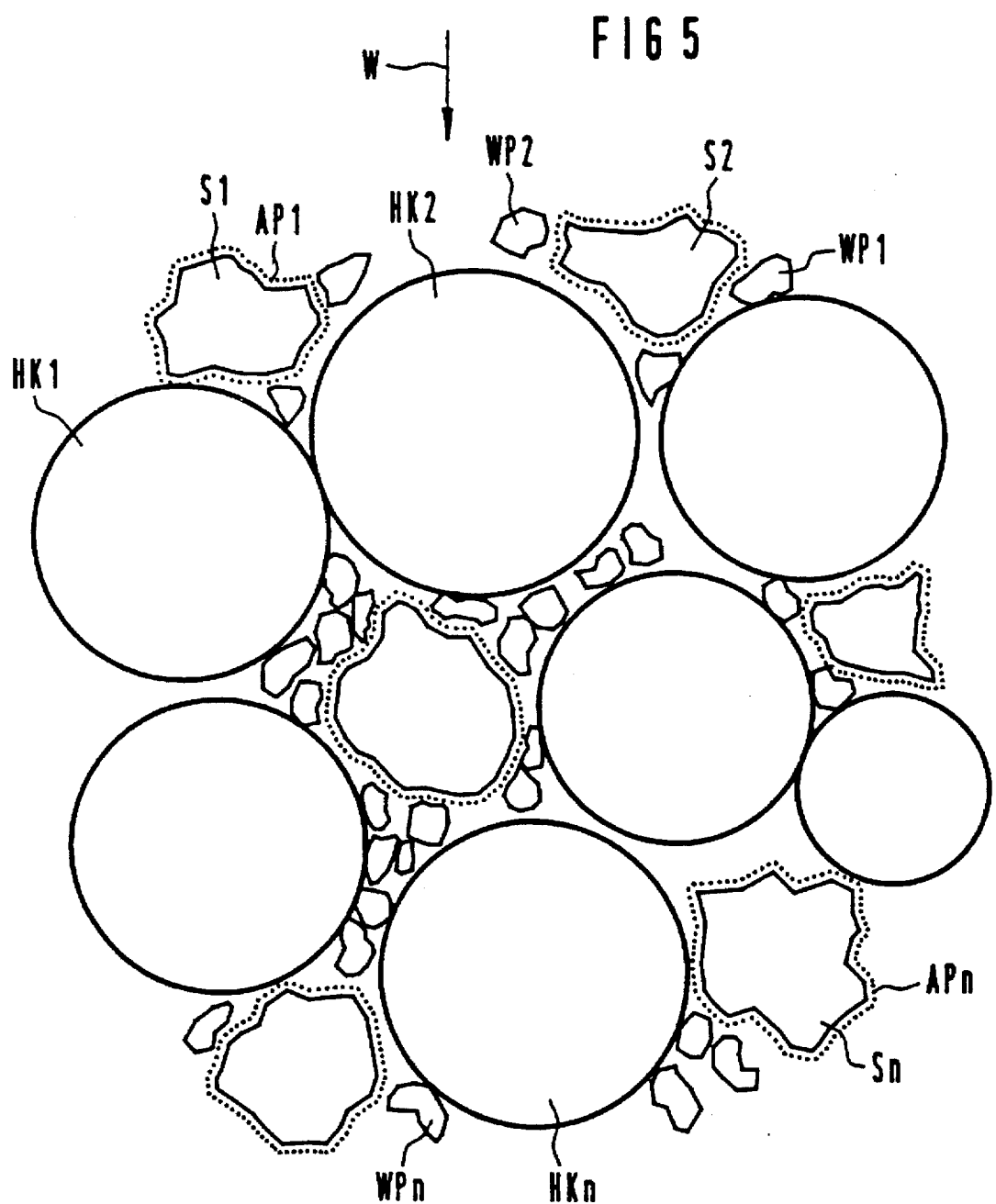
FIG. 5 is an enlarged view of the distribution of swelling powder in the unswelled condition with parting powder as well as with hollow microspheres.

The parting effect of the particles of the parting powder AP1 through APn shown in FIG. 4 can be advantageously improved to achieve an even better separation of the swelling powder particles. A plurality of unswelled swelling powder particles S1 through Sn are shown in FIG. 5, whereby a plurality of small hollow balls HK1 through HKn are additionally provided. These small hollow balls are intimately blended with the swelling powder particles S1 through Sn and separate them from one another.

Given water exposure, as indicated by the arrow W, an improved access of the water to the swelling powder particles lying at the bottom is even more easily possible in this way and these impede each other less during the swelling process. In addition, further powder particles WP1–WPn, particularly of plastic material (for example, polyethylene powder), may be provided which are advantageously smaller than the unswelled swelling powder particles S1 through Sn and which are also smaller than the hollow microspheres HK1 through HKn. Given an appropriate intimate blending, these further powder particles WP1 through WPn likewise lie between the larger swelling powder particles S1 through Sn and the hollow microspheres HK1 through HKn and effect the corresponding spacings, facilitating water access to the more deeply located swelling powder particles.

It is also possible, for example, to provide only hollow microspheres HK1 through HKn, swelling powder S1 through Sn as well as additive powder AP1 through Apn and to work without further powder additives, i.e. without the particles WP1 through WPn, in the manufacture of the filling compound. It is further possible to omit the hollow microspheres HK1 through HKn, so that the filling compound is essentially composed only of the swelling powder particles S1 through Sn, of the additive powder Ap1 through Apn acting as parting agent and of the further powder particles WP1 through WPn.

I. Compositions for electrical cables:

I.1. Range particulars of filling compounds for electrical cables:

The following ranges of the compositions are especially expedient for electrical cables according to FIG. 1 or FIG. 2, for instance, whereby true volume % of the particles are meant below in the particulars about the parts, when not indicated otherwise, and, thus, the air between the particles is not included in the calculations. The swelling powder is always assumed as being in the unswelled condition, i.e. dry. The filling compound FS1 of FIG. 1 or FSX of FIG. 2 should expediently contain, in toto:

I.1.a Composition of the filling compound of swelling powder and additive powder:

swelling powder S1 through Sn between 94 volume % and 99.9 volume %, preferably 98 volume % through 99.9 volume %;

parting powder Ap1 through Apn between 6 volume % and 0.1 volume %, preferably 2 volume % through 0.1 volume %.

Due to its less favorable values of the relative dielectric constant, this mixture is especially suitable for high-tension cables.

L1.b Composition of the filling compound of swelling powder, parting additive powder and further filler power parts:

swelling powder S1 through Sn between 10 volume % and 70 volume %, preferably between 20 volume % and 40 volume %;

additive powder AP1 through APn as parting powder between 0.1 volume % and 6 volume %, preferably 0.1 volume % through 3 volume %;

further filler powder parts WP1 through WPn between 85 volume % and 30 volume %, preferably 80 volume % through 50 volume %.

This mixture is suitable both for high-voltage cables as well as for electrical communication cables.

The composition here and in the following examples is freely selectable within the specified ranges (i.e., for example, 65 volume % S1 through Sn plus 5 volume % AP1 through APn plus 30 volume % WP1 through WPn), whereby the overall sum of the individual volume % of the true volume must respectively yield 100%.

L1.c Filling compound like L1.b, but with an additional oil or, respectively, adhesive additive between 1 volume % through 5 volume %, preferably 1 volume % through 3 volume %, to avoid the creation of dust.

The mixtures of L1.b and L1.c are suitable both for high-voltage as well as for electrical communication cables.

L1.d Filling compound with swelling powder, additive powder as parting powder, further filler powder parts as well as small hollow bodies:

swelling powder S1 through Sn between 3 volume % and 50 volume %, preferably 3 volume % through 10 volume %;

additive powder Ap1 through Apn as parting powder between 0.5 volume % and 6 volume %, preferably 1 volume % through 2 volume %;

further filler powder parts WP1 through WPn between 0 volume % and 60 volume %, preferably 10 volume % through 30 volume %;

oil or adhesive material for avoiding dusting between 0.5 volume % and 5 volume %, preferably 1 volume % through 3 volume %;

elastic small hollow bodies HK1 through HKn between 10 volume % and 90 volume %, preferably 50 volume % through 90 volume %.

This mixture is especially favorably suited for electrical communication cables.

L2 Individual compositions for electrical cables:

Especially preferred mixtures, calculated in bulk volume (i.e. not in true volume) are recited below.

L2.a A first filler mixture is composed of:

5 volume % swelling powder S1 through Sn with average particle size of 30 µm;

1 volume % highly dispersed silicon dioxide (AP1 through APn) with particle size 0.01 µm;

5 volume % further filler powder parts WP1 through WPn (PE powder) with average particle size 10 µm;

40 volume % hollow elastic microspheres (HK1 through HKb) with 40 µm;

2 volume % white oil;

47 volume % air in the interstices.

After thorough blending, all particles are surrounded with highly dispersed silicon dioxide in multi-layer coats, preferably on the order of about 10-layer coats (roughly corresponding to a layer thickness of 0.1 µm) and are thereby adequately mechanically separated from one another. In this case, the average distance between swelling powder particles amounts to about 75 µm and that between the particles of the further powder WP1 through WPn (for example, PE powder) amounts to about 25 µm. This about corresponds to the size relationships as shown in FIG. 5.

When water penetrates into a cable that is practically completely filled with the aforementioned mixture in bulk density, then, due to the narrow capillaries, a slight spread of the water first occurs in the surface region. This occurrence is also inhibited in that the surfaces of the particles carry extremely thin oil films because of the oil additive and capillary depression occurs. After only a short distance, the water may encounter many swelling powder particles that, due to the mixture structure, can practically all participate in the swelling process. After a very short flow movement, the waterflow is brought to a standstill because an extremely great number of swelling powder particles S1 through Sn prevents further spreading of the water within an extremely spatially limited region due to their increase in volume.

It follows that it is expedient to employ optimally fine swelling powder and to prevent the mutual agglomeration thereof to the farthest possible extent in order to keep the average spacings of the particles small and to have optimally all swelling powder particles lying in the advancing water front participate optimally quickly and immediately in the swelling process. The particles of the additive powder AP1 through APn, as well as potential further powder particles WP1 through WPn and the small hollow balls HK1 through HKn contribute to this rapid advance of the water front to optimally many swelling powder particles within a tight spatial region because, as shown in FIG. 5, all help in seeing to it that an agglomeration and a firm seating or caking of the swelling powder particles S1 through Sn to one another is prevented to the farthest-reaching extent. The desired effect is all the greater the better the blending of the various particles. These separating particles are always of significance whenever the swelling powder particles S1 through Sn tend toward clumping.

L2.b The following mixture (volume % particulars in true volume, i.e. only volume of the particles or, respectively, oil—no bulk volume) is expedient for filling communication cables, particularly copper local cables:

66.5 weight % "PECMA 200" powder=77.5 volume %

32 weight % "SANWET 3746-1"=21 volume %

1 weight % white oil=1 volume %

0.5 weight % "Aerosil"=0.25 volume %.

"PECMA 200" is a polyethylene powder of the Interorgana Köln company that is employed for cable marking with particle sizes of about 150 µm.

"SANWET 3746-1" of the Hoechst company is a reground swelling powder on the basis of a polyacrylic acid sodium salt that is sieved to a particle size below 50 µm, dried and phlegmatized with white oil (paraffin oil). The mixture has a bulk density of 0.5 g/cm$^3$, i.e. the volume part of the dielectrically less high-grade swelling powder in the mixture is only slightly greater than 10% given bulk density when an air part on the order of magnitude of about 50% is assumed.

L2.c A further mixture comprised the following composition per liter, whereby the bulk volume is indicated:

| | | |
|---|---|---|
| 40 g "LANCO-Wachs PE 1502" = | 42.1 cm$^3$ = | 4.2 volume % |
| 58 g "SANWET 3746-1" = | 36.3 cm$^3$ = | 3.6 volume % |
| 1 g "WACKER HDKH20" = | 0.45 cm$^3$ = | 0.05 volume % |
| 2 g White oil = | 2.25 cm$^3$ = | 0.22 volume % |
| 12 g "EXPANCEL DE 551" = | 289.2 cm$^3$ = | 28.93 volume % |
| 113 g | 370.00 cm$^3$ | 37.00 volume % |

The air part in the gores between the powder constituents thus amounts to 63 volume %.

"LANCO-Wachs PE 1502" is a PE powder of Langer and Co., D-27721 Ritterhude Ihlpohl having particle sizes around 15 μm. "WACKER HDK H20" is a highly dispersed silicon dioxide having particle sizes around 0.015 μm of Wacker Chemie. "EXPANCEL DE 551" are hollow microspheres of the Expancel company on the basis of a polyvinylidene-acrylonitrile copolymer having about a 40 μm outside diameter in the uncompressed condition. These hollow spheres have extremely thin walls, so that they are essentially composed of an air-gas fill in terms of volume and only about 7.5 cm³ wall material (true volume) is present given a quantity of 12 g. The recited mixture given bulk density is thus composed of only about 9 volume % of the solid state material and the oil and 91% gas, this, of course, having especially favorable dielectric and loss factor properties.

For the purpose of a better understanding, the weight percents and their volume percents recited for the last-cited mixture are recited referred to the true volume (i.e., not including the air in the gores):

|  |  | true volume |
|---|---|---|
| LANCO wax | 35.4 weight % = | 11.5 volume % |
| SANWET | 51.3 weight % = | 9.8 volume % |
| WACKER HDK20 | 0.9 weight % = | 0.1 volume % |
| White oil | 1.8 weight % = | 0.6 volume % |
| EXPANCEL | 10.6 weight % = | 78. volume % |
|  | 100 weight % | 100 volume % |

The relative dielectric constant $\epsilon$ at bulk density and undried was $\epsilon_r=1.21$ at 1 kHz and proved decreasing to $\epsilon=1.16$ at 1 MHz. The loss factors at said frequencies amounted to $\tan\Delta$ (1 kHz)=$88\times10^{-4}$ and $\tan\Delta=43\times10^{-4}$ at 1 MHz.

Figure 6:
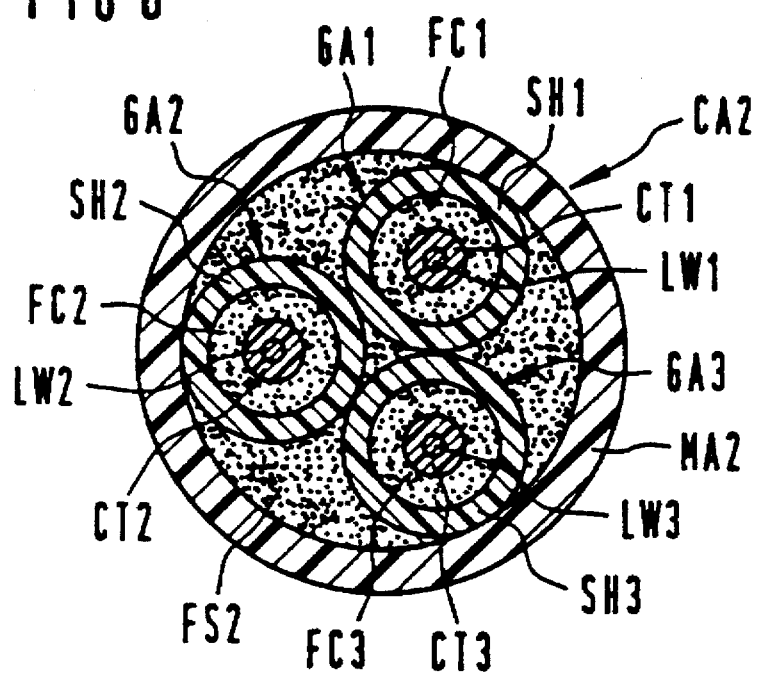
FIG. 6 is a sectional end view of an optical cable in cross-section as a further exemplary embodiment of the invention.

FIG. 6 shows an optical cable CA2 whose single-layer or multi-layer outside cladding is referenced MA2. The interstices are entirely or partially filled with a filling compound FS2. The statements made in conjunction with electrical cables according to FIGS. 1 and 2 in view of the filling are analogously valid. The core filling compound FS2 contains at least a swelling powder and an additive powder as parting powder and also advantageously contains an additive of oil or adhesive material such that this filling compound is largely prevented from giving off dust. The filling compound can also additionally contain highly elastic microspheres. A plastic powder, for example a polyethylene powder can be potentially added as further filler material. In order to assure better adhesion, the surfaces of the light waveguide leads GA1 through GA3 can be coated with an oil or adhesive material before the application of the filling compound FS2. This filling compound FS2 completely or partially fills the interstices between the light waveguides GA1 through GA3.

The optical fiber buffer tubes GA1 through GA3 are respectively composed of a protective sheath SH1 through SH3 of plastic material (single-layer or multi-layer), whereby at least one optical fiber LW1 through LW3 that is provided at the outside with a protective coating CT1 through CT3 likewise composed of plastic material is respectively provided in the inside. Instead of a single light waveguide, a plurality of optical fibers can also be arranged in the inside at a common protective sheath SH1 through SH3 (multifiber loose buffer or the like).

The mixtures recited above under examples I.1a,b,c and d for electrical cables can likewise be employed as core filling compound for such an optical cable. When both electrical as well as optical fiber buffer tubes are combined within an outside cable cladding MA2, then the filling compounds cited under I.1.b,c and d can be especially employed since communication cables are thereby generally involved.

The optical fiber buffer tube GA1 can also be constructed as composite buffered fiber, whereby a glide material and/or expanded plastic can, for example, likewise be provided between the outer lead sheath SH1 through SH3 and the protective coating CT1 through CT3 of the light waveguides LW1 through LW3.

Figure 7:
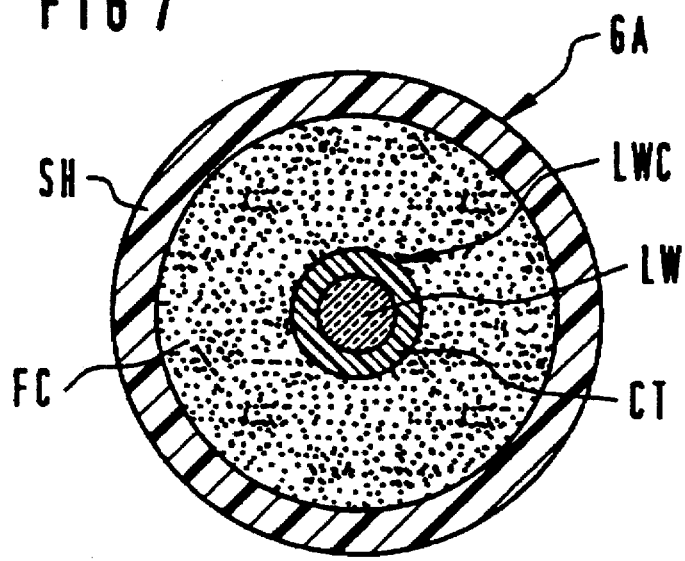
FIG. 7 is a sectional end view of a filled, hollow optical fiber buffer tube as exemplary embodiment of the invention.

In an enlarged scale, FIG. 7 shows the structure of a light waveguide lead GA having a light waveguide LWC is provided that comprises the actual optical transmission fiber LW as well as the appertaining, outer protective coating CT. These light waveguide leads can be constructed as tight buffered fiber, composite buffered fiber, single fiber loose buffer tubes (as shown) or, respectively, multifiber loose buffers and can thus contain one or more optical waveguides in loose or fixed configuration. A plurality of light waveguides can also be combined to form ribbons which may be arranged stacked within the protective sheath SH. A optical fiber buffer tube filling compound FC is provided for filling out the interstices within the protective sheath SH, whereby mixtures corresponding to example I.1.a through d can be especially employed therefor.

As in the example I.1.d, mixtures that contain compressible hollow microspheres are especially preferred because a good cushioning of the light waveguides is thereby achieved. The light waveguide or waveguides LWC provided with a protective sheath lie inside the tubular protective sheath, and the lead filling compound FC employed here should contain at least a swelling powder, whereby the individual particles of the swelling powder are to be expediently introduced such that the mobility of the light waveguide or waveguides LWC is adequately assured under all operating conditions. The buffer tube filling compound FC should thus not comprise an excessively high bulk density.

It should be pointed out here that the swelling powders to be employed do not develop any significant swelling pressure upon access of water and thus do not exert any undesired, local pressure forces on the light waveguide or waveguides LWC in this case. In the case of incursion of water, the swelling powder merely turns into a gel-like substance in which the light waveguides can still adequately move.

Potential, further filling powder parts (e.g., very fine PE powder) corresponding to example I.1.c or d can be added for lower the cost of the filler, whereby the considerations raised above about the particle size likewise analogously apply.

As mentioned above, especially beneficial properties are obtained when an optimally high proportion of highly elastic hollow microspheres is additionally added in addition to the swelling powder and the additive powder acting as parting powder (as well as potentially other filler powders). Given employment of highly elastic hollow microspheres having true densities of 40 kg/m³ and particle sizes of 40 μm with very thin walls, the parting agent added as additive powder, preferably in the form of highly dispersed silicon dioxide, yields a greater mobility of these particles relative to one another in addition to yielding an improvement given water access (preventing the formation of lumps). As already mentioned in the preceding examples, slight quantities of oil or adhesive material can be added in order to avoid dust and for improved adhesion.

In order to exert optimally no local pressure peaks on the light waveguide or waveguides, the particle sizes of the employed particles should be selected significantly smaller than the diameter of the light waveguide or light waveguides LWC, i.e. generally significantly under 250 µm. Within the framework of lead filling compounds, particle sizes of the particles employed for the filling compound FC between 100 µm and 1 µm are preferred, preferably around 1 µm through 10 µm. Since such fine-dust powders are difficult to process, a phlegmatization agent for prevention of dust formation should expediently be added to them, particularly in the form of oil and/or an adhesive material. Here, too, the fine additive powders and potentially further powder parts (for example, PE powder) advantageously exhibit an especially fast response in the swelling given water access because a lumping is largely prevented by their surface treatment. The points raised in conjunction with FIGS. 4 and 5 are analogously apply here.

When hollow microspheres are employed in buffer tube filling compounds, these should have wall thicknesses of about 0.4 through about 0.5 µm ("EXPANCEL 551 DE" of the Expancel company). These have true densities of 28 kg/m$^3$ and particles sizes of about 40 µm. "EXPANCEL 551 DE" of Expancel Nobel Industries yields, for example, bulk densities of 20 g/l. In terms of volume, this density corresponds to a foaming between 98 and 99 volume % (e.g., given a composite buffered fiber). By mixing in swelling powder and other filler substances, the proportion of solid state volume material, of course, becomes higher, as the example I.2.c shows, whereby a soft embedding of the light waveguides is also assured given this fill.

Only relatively little swelling powder must be used with correspondingly high proportions of hollow microspheres. This is because a large part of the volume to be sealed is already filled with the hollow microspheres. Upon water incursion, the advance of the water is greatly retarded by the extremely narrow capillary system formed by the hollow microspheres and the other filler powders, and furthermore, because a clumping of the swelling powder upon water access is prevented by the spatial separation of the swelling particles by the parting powder, the hollow microspheres, filler powder particles, and the hollow microspheres. Given entry of water, thus, one need only count on an extremely short advance of the water front even given low swelling powder parts and, potentially, a filling that is not complete, and the existing swelling powder always remains fully effective.

A partial or far-reaching filling of the inside of the single fiber loose buffers with highly elastic hollow microspheres between which comparatively few swelling powder particles or additionally introduced powders are located opposes only slight resistance to displacement of the light waveguides LWC. The filling also compensates local pressure peaks and effects a certain cushioning of the light waveguides relative to one another (given a plurality of light waveguides within the protective sheath SH) and relative to the outside wall SH.

The employment of swelling powder particles having diameters on the orders of magnitude from 1 to 10 µm generally does not lead to local pressure peaks and, thus, increases in attenuation of the light waveguides. Since such extremely finely ground swelling powder particles represent a certain outlay, and because such a fineness cannot be achieved with standard mills, but rather require micronizers, the highly elastic and very compressible hollow balls may be employed for the cushioning effect. Given correspondingly large and highly elastic hollow balls, coarser swelling powder particles can also be employed such as, for example, "SANWET 3746-1" (Hoechst) whose particles sizes lie in the area of ≤50 µm.

The filling compound FC can be introduced by coating the light waveguide or waveguides LWC according to FIG. 7 with a very thin layer of an adhesive. An oil and/or a glue can be employed as adhesive. The surface of the light waveguide is appropriately wetted by spraying or by application with a felt or sponge, and, subsequently, the actual filling compound FC can be applied by a fluidized bed before the outer sheath SH is applied by extrusion. However, it is also possible to apply the filling mixture FC with electrostatic methods, whereby an appropriate charge is applied onto the light waveguide (coating) composed of insulating material.

Microspheres that have not yet been expanded can also be employed instead of hollow microspheres. These balls expand to their ultimate size after application to the light waveguide as a consequence of applying heat, e.g., in a heating path or in the buffer tube sheath extruder.

A further possibility for the application is by first applying expanded hollow microspheres or non-expanded particles onto the optical fiber (particularly onto a optical fiber coated with glue or oil) in a separate work step and to then apply the swelling powder or, respectively, the swelling powder mixture in a further step. In this case, each optical fiber is provided with a highly elastic cushion layer of microspheres. As warranted, an adhesive can also again be additionally lightly sprayed on after the application of the powder mixture FC and before the protective sheath is extruded on, in order to thus prevent the coating applied in this way from falling off from the light waveguide LWL.

A number of advantages can be achieved with the aforementioned measures. In particular, the cost of the tube filling mixture may be substantially reduced because no high-grade materials are required and the weight parts that are employed can be kept extremely low (as a consequence of the low specific weight). Since the fill is thus composed of air and economical solids to the extent possible, there are no unfavorable interactions with the wall material SH of the light waveguide leads and the coating CT of the light waveguides LWC. As a result, the selection possibilities for employable wall materials of the tubes or protective sheaths can be considerably expanded compared to the use of paste-like buffer tube filling compounds with correspondingly high oil parts.

It is also advantageous that no problems occur with the buffer tube filling compound dripping off, even over relatively long storage times, and that the lead filling compound does not run out even at higher temperatures. The temperature response otherwise observed given pasty buffer tube filling compounds is also avoided because the mechanical properties of the essentially powdered filling compound are not temperature-dependent or are only very slightly so, namely by contrast to paste filling compounds. Another advantage, especially in view of splicing events, may be seen therein that the buffer tube filler (corresponding to FIG. 7) as well as the core fill (corresponding to FIG. 6) can be easily removed.

The employment of swelling powder as lead filling compound also has another advantage. As already mentioned, water advances into the inside of the protective sheath SH of the light waveguide leads GA of FIG. 7 only over very short distances (and, therefore, in only a very slight amount). Water and swelling powder thereby form a soft gel which does not freeze into a solid mass at temperatures below 0° C. Such a light waveguide lead is therefore protected better against the negative influences of ice formation given the penetration of water than traditional filling compounds.

Pressure that arises from potential residual water or the jelling of the swelling powder parts is largely absorbed in the presence of small hollow balls, which compress. In this case, too, no local increases in attenuation occur in the light waveguide or waveguides.

II. Compositions for optical cables:

II.1 Range particulars of filling compounds for optical leads (for example, for single fiber loose buffers, composite buffered fibers, multifiber loose buffers, etc., analogous to FIG. 7 with direct contact between light waveguide and filling compound). All values are recited in true volume percent.

II.1.a

Swelling powder S1 Sn between 94 volume % and 99.9 volume %, preferably 96 volume % through 99 volume %; and Parting powder AP1–APn between 6 volume % through 0.1 volume %, preferably 0.1 volume % through 2 volume %.

II.1.b

Swelling powder S1–Sn between 93.5 volume % and 99 volume %, preferably 96 volume % through 99 volume %;

Parting powder AP1–APn between 0.1 volume % through 6 volume %, preferably 0.1 volume % through 2 volume %; and Oil or, respectively, glue between 0.5 volume % through 5 volume %, preferably 1 volume % through 3 volume %.

II.1.c

Swelling powder S1–Sn between 5 volume % and 50 volume %, preferably 10 volume % through 40 volume %;

Parting powder AP1–APn between 0.1 volume % through 6 volume %, preferably 0.1 volume % through 3 volume %;

Oil or, respectively, glue between 0.5 volume % through 5 volume %, preferably 1 volume % through 3 volume %;

Filling powder parts between 49 volume % through 94 volume %.

II.1.d

Swelling powder S1–Sn between 3 volume % and 50 volume %, preferably 4 volume % through 20 volume %;

Parting powder AP1–APn between 0.1 volume % through 6 volume %, preferably 0.1 volume % through 3 volume %;

Oil or, respectively, glue between 0.5 volume % through 5 volume %, preferably 1 volume % through 3 volume %;

Filling powder parts WP1–WPn between 0 volume % through 30 volume %, preferably 0 volume % through 20 volume %; and Small hollow balls HK1–HKn between 49 volume % through 96 volume %, preferably 60 volume % through 90 volume %.

The above compositions apply analogously to the filling of the channels of chambered cables or U-profiles that contain separate light waveguides or light waveguides LWL combined into ribbons, whereby the mixture II.1.d is preferred.

With composite buffered fibers, only very thin layers of the fill mixtures are applied onto the individual light waveguides before the protective sheath is applied. Mixture II.1.d is again also preferred here.

II.2. Range particulars of core filling compounds for optical cables analogous to FIG. 6.

The mixtures according to I.1.b through I.1.d can preferably be utilized here, since the demands are lower compared to buffer tube filling compounds according to II.1.

Figure 8:
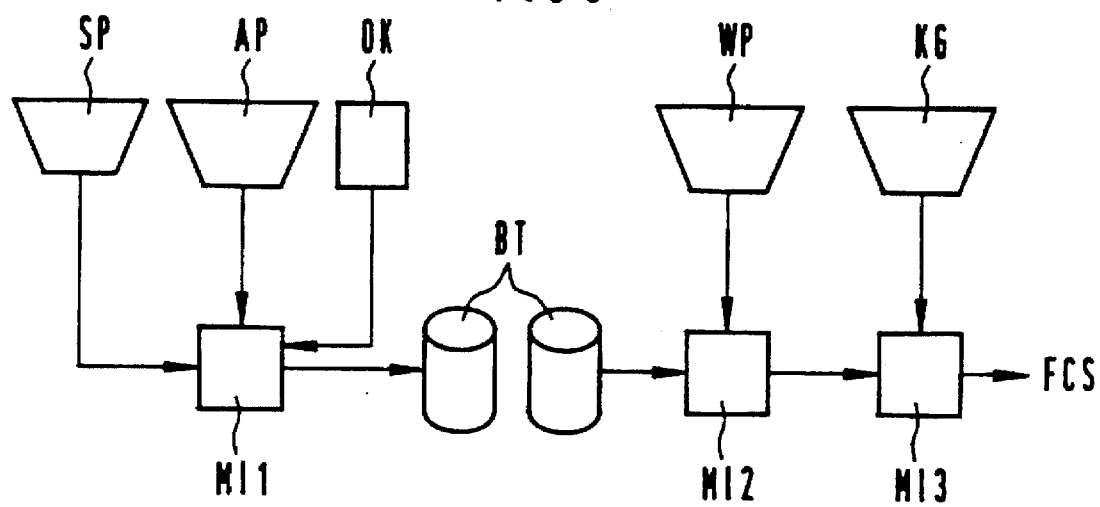
FIG. 8 is a schematic view of a system for manufacturing a filling compound for an electrical or optical cable of the invention.

FIG. 8 shows a schematic illustration of a system for preparing and manufacturing a filling compound of the invention. At least a supply of swelling powder SP, for example in a corresponding container, as well as a further supply of highly dispersed additive powder AP are present as basic equipment. The two substances are supplied to a first mixer, MI1, where they are intimately blended with one another. A turbulence chamber in which the dust-like coating layers of the parting powder are applied onto the swelling powder particles is especially suited therefor.

Since one should expediently proceed on the basis of especially fine swelling powder (i.e. swelling powder that also contains substantial quantities of fine dust that could cause health problems given improper handling), the following manufacturing method is expedient:

The producer of the swelling powder regrinds the swelling powder, dries it, possibly sieves it, and adds the parting powder. In order to optimally avoid dust loads, the mixture of swelling powder SP and parting powder AP is already phlegmatized here by addition of a slight oil or, respectively, glue additive OK. This can expediently ensue in the mixer means MI1, whereby the agglomeration and adhesion of the parting agent layer to the larger swelling powder particles can be improved in that the swelling powder particles are first blown through an oil mist and the dusting with the parting powder is then implemented. It is thereby beneficial to inject the oil or, respectively, glue during the mixing process. However, the van der Waal forces may be adequate to effect the adhesion of the parting powder particles to the swelling powder particles.

The powdered basic substance for swelling and parting powder and potentially phlegmatized is packaged in air-tight and moisture-tight containers BT, and is thus delivered for use in the cable factory in practically dry form. Since this basic substance is an important constituent in the proposed mixtures, this procedure provides the advantage that the cable manufacturer may himself manufacture the ultimate filling compound mixture, FCS, suitable for the respective application from among his various applications shortly before introduction into the cable.

This procedure can ensue in a mixing vessel, MI2, in which the powdered basic substance from the container, BT, is mixed, for example, with a further powder part WP (for example, PE powder). In the same or preferably separate mixer, MI3, the hollow microspheres KG can be introduced into the mix as required. However, it is also possible to continuously implement the entire mixing process in the cable factory. The elements shown in FIG. 8 then form a single, continuous production line.

Figure 9:
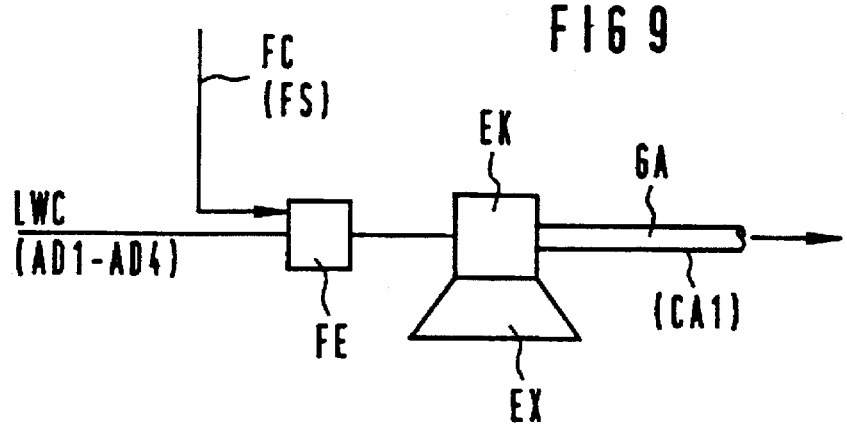
FIG. 9 is a schematic view of an apparatus for manufacturing a cable or an optical lead according to one of the FIGS. 1, 2, 6 or 7.

FIG. 9 shows an apparatus for manufacturing a cable or an optical lead according to one of the FIGS. 1, 2, 6 or 7 allocated to a cable works. Specifically, a optical filler LWC corresponding to FIG. 7 is introduced into a filling apparatus FE. The finished filling compound powder mixture FC is supplied to this filling apparatus FE. In a following extruder EX, the outer protective sheath SH is applied with the appertaining extrusion head EK, so that a light waveguide lead GA emerges, for example in the form of a single fiber loose buffer.

For filling, as shown for example in FIG. 7, a single fiber loose buffer, the potentially lightly oiled light waveguide or waveguides LWC coated with filler material can be conducted via a nipple into the extruder EX, where the protective sheath or sheaths are then applied. It is also advantageous to first apply a single-layer coating of highly elastic hollow microspheres onto the light waveguide or waveguides LWC, being lightly coated with oil or glue in a separate work step. As a result, every light waveguide is provided with an elastic cushion. This can ensue in that expanded or expandable microspheres ("EXPANCEL D"=Expancel dry, unexpanded) are applied and which are inflated in a heating path or which expand when the protective sheath is applied. As an outer layer, the other desired filling compound powders, particularly the swelling powder and the parting powder, are then applied onto the one or more light waveguides.

Densities of about 40 kg/m$^3$ given particles sizes in the range of about 40 μm are achieved with the employment of highly elastic, hollow microspheres (for example, "Expancel 551 DE" or "Expancel 091 DM" of Expancel Nobel Industries). Bulk densities of about 20 g/dm$^3$ thus derive. This density corresponds to a foaming of 98 to 99%, i.e. a soft embedding of the light waveguide LWC given a completely filled structure of a light waveguide lead as shown in FIG. 7.

Instead of an individual light waveguide, a plurality of light waveguides can also be arranged in the inside of a common protective sheath (for example, multifiber loose buffers). If high proportions of hollow microspheres are used, only relatively little swelling powder is used. This is at least partly because half of the volume to be filled is filled up with the hollow microspheres. Also, upon water incursion, the advance water is greatly retarded by the extremely narrow capillary system formed by the hollow balls, and, further, a clumping of the swelling powder upon water access is prevented by the spatial separation of the swelling particles by the parting powder and by the hollow balls. Upon entry of water, one need only count on an extremely short advance of the water front even given low swelling powder parts, and the existing swelling powder always remains fully effective.

A filling of the interior of the single loose fiber buffers according to FIG. 7 includes highly elastic hollow balls, between which comparatively few swelling powder particles or particles of other additionally introduced powders are located. These elastic hollow balls slightly oppose resistance to a displacement of the light waveguides LWC, compensate local pressure peaks, and effect a certain cushioning of the light waveguides relative to one another (given a plurality of light waveguides within the protective sheath SH) as well as relative to the outside wall SH. Swelling powder particles having diameters around 1 to 10 μm generally do not lead to local pressure peaks and increases in attenuation of the optical fibers. Given employment of hollow microspheres, larger swelling powder particles can also be employed due to the cushioning effect of the former.

When an electrical cable CA1 (see FIGS. 1,2) is to be manufactured, then individual electrical leads AD1 through AD4 are supplied to the filling means FE in FIG. 9 and are provided with the nearly-powder filling compound FS in the filling means FE. The application of the outside cladding subsequently ensues with the extrusion head EK, so that, for example, a cable CA1 of FIG. 1 is produced as a finished product. One proceeds analogously in the manufacture of an optical cable according to FIG. 6.

The introduction of the mixture serving as filling compound into copper cable cores, light waveguide cable cores, or into light waveguide buffer tubes also can ensue in various ways. Thus, stranded copper conductor cores having a low number of pairs, cores of light waveguide single fiber loose buffers stranded single-ply around a carrier element, the channels of a chambered cable or U-profiles stranded around a carrier element, etc., and their interstices can be filled in that, for example, they are drawn through a fluidized bed containing the filler mixture.

Figure 10:
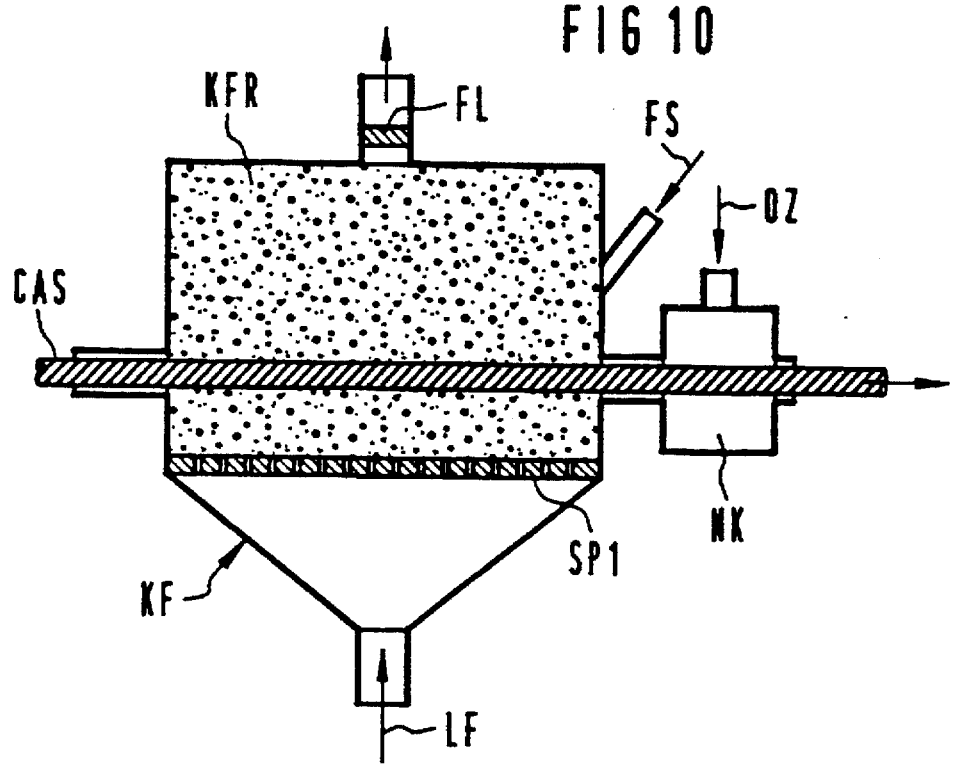
FIG. 10 is a schematic sectional view of a cable processing device wherein a cable core, such as a stranded group of cable members, is introduced into a filling chamber.

FIG. 10 shows details directed thereto, wherein a cable core CAS (composed of electrical and/or optical conductors, preferably in their stranded-condition) is introduced into a filling chamber KF. The powdered filling substance FS (composed of swelling powder and parting powder, potentially with additives of further filler powder and/or hollow microspheres) is blown in the upper part KFR of the filling chamber via an opening. Air LF that proceeds upward into the actual filling space, KFR, is supplied from below via a sinter plate SP1, having openings or nozzles. In turn, the air can escape via a filter. The cable core CAS, passes through the actual filling space, KFR, of the filling chamber, KF, and is dusted or coated with the filling compound, FS, on all sides. Due to great turbulence in a fluidized bed within the actual chamber, KFR, the interstices are extensively filled between the core structural elements, and the cable core, CAS, is extensively covered in an all-around coating or covering.

In order to assure a better fixing of the filling compound, FS, on the cable core CAS, the surface of the coated cable core, CAS, can be sprayed with oil subsequent to the filling chamber, KF, process. This oil additive, for example, can be finely sprayed in a following misting chamber, NK, and to deposit on all sides of the cable core, CAS. This oil thereby effects a mechanical securing of the position of the powdered filling compound, FS. This oil additive, OZ, is preferably kept so slight that the applied filling material, FS, remains essentially a powder, i.e., does not form a gel.

Before admission into the coating means, KF, it is also possible to superficially spray the cable core or cable core elements (for example, quads) with an oil or glue material in order to improve the adhesion of the filling material supplied in powdered form on the surface.

A foil can be advantageously applied onto the cable core, CAS, provided with filling compound in order to prevent the filling compound FS from falling off. The outside cladding of the cable to be formed is then extruded onto this foil.

When the cable is composed of a plurality of sub-bundles (basic bundles), a coating system as shown in FIG. 10 is allocated to each of these individual bundles.

Figure 11:
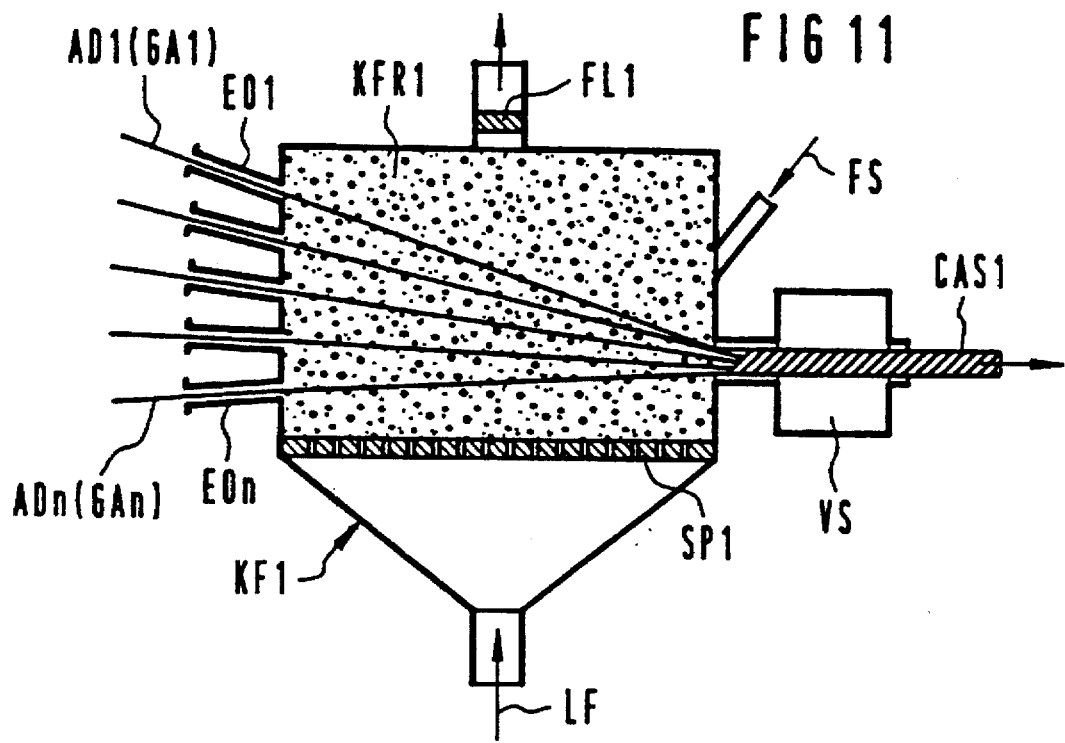
FIG. 11 is a schematic sectional view of a cable processing device wherein cable members or groups are separately passed through a filling chamber during stranding.

When conductor elements are tightly packed inside a cable core, CAS, it can be difficult to adequately fill the interior with filling compound, FS. Thus, one can proceed according to FIG. 11 given a greater plurality of conductor elements. The individual conductor elements, for example electrical leads AD1 through ADn and/or optical transmission elements (for example, light waveguides or single fiber loose buffer tubes or the like), GA1 through GAn, or lead groups (for example, quads or basic bundles) are supplied to a filling chamber that is constructed similar to the filling chamber KF of FIG. 10. This filling chamber KF also includes a turbulence plate made, for example, of sintered material and is provided with an opening, SP1, and air is withdrawn through an air filter, FL1. The individual electrical and/or optical transmission elements, AD1 through ADn, or, respectively, GA1 through GAn, and/or the groups thereof are introduced into the inside of the filling chamber, KFR1, via preferably nozzle-like admission openings, EO1 through EOn. These transmission elements are filled with and surrounded by the whirled up, powdered filling compound FS on all sides therein in the fluidized bed. The elements are stranded to form a core, whereby the stranding point expediently lies at the output of the filling chamber.

The stranding means can also be fashioned as an SZ stranding means and can be arranged immediately following the filling chamber. The cable core, CAS1, formed by the stranding of the individual conductor elements is also provided with powdered filling compound parts in its inside region. Upon the incursion of water, the swelling powder prevents a spread of the water in an especially effective way. A fixing analogous to the misting chamber, NK of FIG. 10, that sprays oil or glue material can be implemented in the outside region, i.e. in the area of the surface of the cable core, CAS1. However, it is also possible to follow the filling means of FIG. 11 with a separate, additional filling means for the cable core that corresponds to FIG. 10.

Further, as shown in FIG. 11, it is also possible to provide the individual conductor elements, AD1 through ADn and GA1 through GAn, with a sticky or oily substance before entry into the filling chamber, KF1, in order to improve the adhesion of the powdered filling compound, FS, at the surface of the conductor elements. The powdered filling material, FS, can also be applied with electrostatic methods, i.e. charged powder particles are applied to oppositely charged or, respectively, grounded or oppositely charged conductor particles and thus adhere especially firmly.

Various changes and modifications to the presently preferred embodiments will be apparent to those skilled in the art. Such changes and modifications may be made without departing from the spirit and scope of the present invention and without diminishing its attendant advantages. Accordingly, the appended claims are intended to cover such changes and modifications.

What is claimed is:

1. A cable comprising:
   a powered filling compound filling interspaces in the cable, the filling compound including:
   water-absorbent swelling powder particles; and
   parting powder particles, the parting powder particles being mixed with the swelling powder particles and being arranged such that the parting powder particles separate the swelling powder particles from one another such that water may flow through the separation caused by the parting powder particles.

2. The cable according to claim 1, wherein the size of the parting powder particles is smaller than the size of the swelling powder particles.

3. The cable according to claim 2, wherein the size of the parting powder particles is less than 1/10 of the size of the swelling powder particles.

4. The cable according to claim 2, wherein the size of the parting powder particles is less than 1/100 of the size of the swelling powder particles.

5. The cable according to claim 2, wherein the size of the parting powder particles is between 1/100 and 1/200 of the size of the swelling powder particles.

6. The cable according to claim 1, wherein the size of the parting powder particles is below 1 µm.

7. The cable according to claim 1, wherein the size of the parting powder particles is below 0.1 µm.

8. The cable according to claim 1, wherein the parting powder is a highly dispersed, inorganic powder.

9. The cable according to one of the preceding claims, wherein the parting powder includes particles selected from the group consisting of silicates, $SiO_2$, bentonites, and montmorillonites.

10. The cable according to claim 1, wherein the filling compound contains less of the parting powder than the swelling powder.

11. The cable according to claim 1, wherein the filling compound contains between 94 and 99.9 volume % true volume swelling powder and between 0.1 volume % and 6 volume % parting powder.

12. The cable according to claim 1, wherein the filling compound further contains other powder parts.

13. The cable according to claim 12, wherein the filling compound further contains polyethylene powder.

14. The cable according to claim 12, wherein a particle size of the other powder parts is about the same as the size of the swelling powder particles.

15. The cable according to claim 12, wherein the filling compound has between 10 and 70 volume % swelling powder, 0.1 through 6 volume % parting powder, and between 30 volume % and 85 volume % other powder parts.

16. The cable according to claim 1, wherein the filling compound further includes an oil or adhesive additive of an amount sufficient to prevent the filling compound from creating dust during processing and without giving the filling compound a paste-like consistency.

17. The cable according to claim 16, wherein the filling compound contains below 5 volume % the oil or adhesive additive.

18. The cable according to claim 16, wherein the filling compound contains between 1 and 3 volume % the oil or adhesive additive.

19. The cable according to claim 16, wherein the added oil or adhesive has a viscosity below 500 mPas.

20. The cable according to claim 16, wherein the filling compound has between 93.5 volume % and 99 volume % swelling powder, (S1 through Sn), between 0.1 volume % and 6 volume % parting powder, and 0.5 volume % through 5 volume % oil or adhesive additive.

21. The cable according to claim 1, wherein the filling compound further includes elastic microspheres.

22. The cable according to claim 21, wherein said elastic microspheres are hollow.

23. The cable according to claim 21, wherein the diameters of the elastic microspheres, in an expanded condition, are selected about the diameters of the swelling powder particles.

24. The cable according to claim 21, wherein, the cable is an electrical or optical cable, and wherein the cable core filling compound comprises between 3 and 50 volume % swelling powder, between 0.5 and 6 volume % parting powder, between 0 volume % and 60 volume % other filler powder parts, between 0.5 and 5 volume % oil or adhesive additive, and between 10 volume % and 90 volume % elastic, small hollow balls.

25. The cable according to claim 21, wherein the cable further comprises an optical buffer tube, and wherein the buffer tube filling compound comprises between 3 volume % and 50 volume % swelling powder, between 0.1 and 6 volume % parting powder, between 0.5 and 5 volume % oil or adhesive additive, between 0 volume % through 30 volume % other powder parts, and between 49 volume % and 96 volume % hollow microspheres.

26. The cable according to claim 1, wherein the size of the swelling powder particles is between 1 and 100 µm.

27. The cable according to claim 1, wherein the cable is an electrical cable, and wherein the filling compound has an overall relative dielectric constant below 1.5.

28. A method for manufacturing a cable having a powdered filling compound for filling interspaces therein, the method comprising the steps of:
   providing a water-absorbent swelling powder;
   providing a non-absorbent parting powder;
   mixing the swelling powder and the parting powder with one another to form the powdered filler compound;

providing the powdered filling compound finely distributed in a chamber; and moving one or more leads and/or optical fiber buffer tubes through the chamber, such that the filling compound forms a coating on each respective lead and/or optical fiber buffer tube.

29. The method according to claim 28, further comprising:

introducing a slight oil or adhesive additive during the mixing to prevent the powders from creating dust.

30. The method according to claim 28, further comprising:

mixing other powder parts to the filler compound.

31. The method according to claim 28, further comprising:

mixing hollow microspheres into the filler compound.

32. The method according to claim 31, wherein multiple said leads and/or optical fiber buffer tubes are provided in the form of a cable core, the method including moving the cable core through the filling chamber.

33. The method according to claims 24, further comprising:

spraying an oil onto said lead and/or optical fiber buffer tubes or the cable core to promote adhesion of the applied powder parts thereto.

* * * * *